R. A. McCONAUGHY.
Land Roller.
No. 107,074. Patented Sept. 6, 1870.
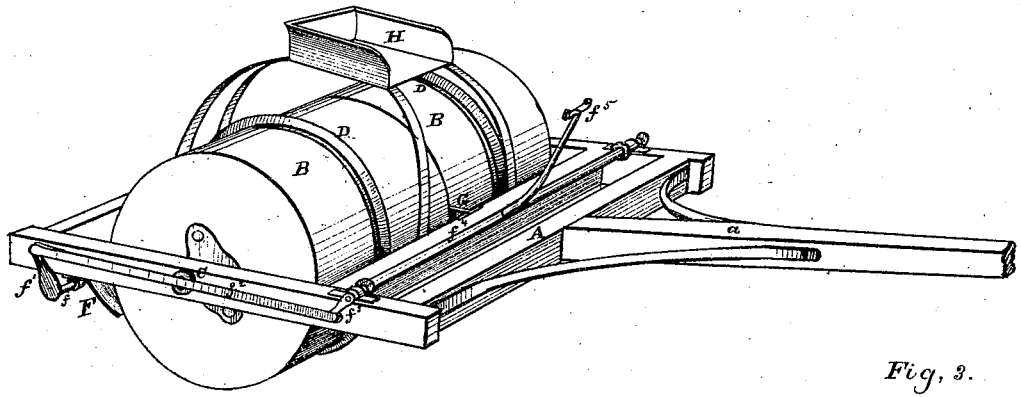
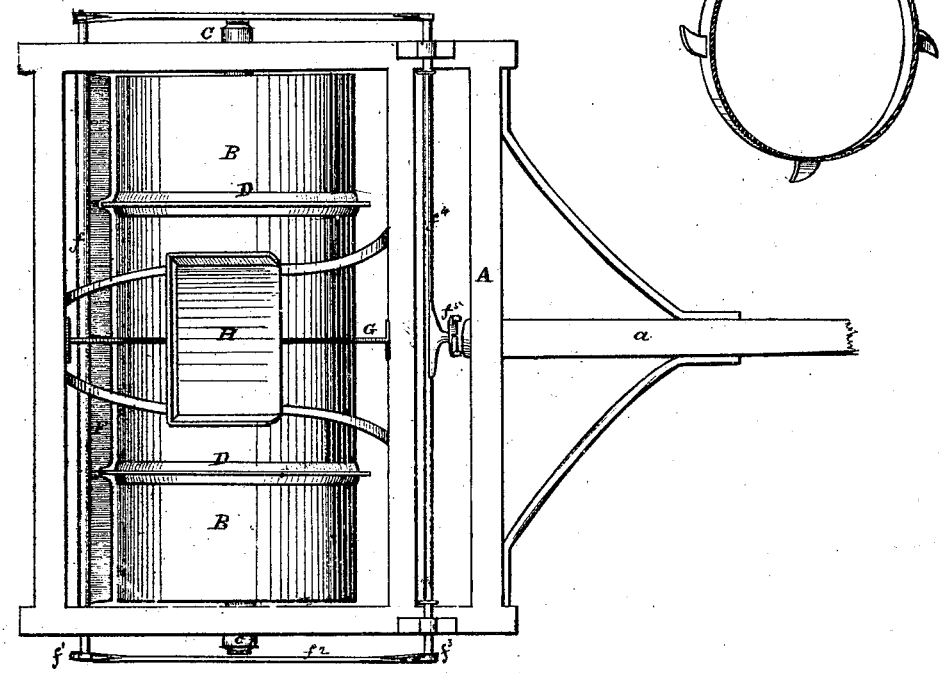
Witnesses,
Chas. H. Myers
N. A. Daniels
R. A. McConaughy, Inventor, by
Chas. S. Whitman, Attorney.

United States Patent Office.

ROBERT ANDERSON McCONAUGHY, OF RIPLEY, OHIO, ASSIGNOR TO JAMES REYNOLDS, SENR., OF SAME PLACE.

*Letters Patent No. 107,074, dated September 6, 1870.*

IMPROVEMENT IN FIELD-ROLLERS.

The Schedule referred to in these Letters Patent and making part of the same.

*To all whom it may concern:*

Be it known that I, ROBERT ANDERSON MC-CONAUGHY, of Ripley, in the county of Brown and in the State of Ohio, have invented a new and useful Improvement in Field-Rollers; and do hereby declare that the following description, when taken in connection with the accompanying drawing hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that class of devices employed in giving a smooth and compact surface to the ground, and, at the same time, preparing it suitably for planting purposes, and The nature thereof consists in the employment of a roller or rollers supplied with a number of removable different-sized flanged rims or rings, supplied with teeth, for forming or cutting furrows in plowed or "sod" ground, as the case may be, for the reception of the seed to be planted, in combination with a frame provided with a scraper and means for operating the same, as hereinafter described.

In the accompanying drawing which illustrates my invention, and forms a part of the specifiation thereof, in which c responding parts are illustrated by similar letters—

Figure 1 represents a perspective view of my invention, as applied to a pair of ordinary field-rollers.

Figure 2 is a plan view of the same; and

Figure 3, a perspective view of a toothed ring, which may be used instead of any one of the rings on the rollers.

The construction and operation of my invention are as follows:

A designates a frame of rectangular shape, and supplied with the tongue $a$ rigidly secured thereto by means of metallic braces.

B B are two ordinary field-rollers, through which, at their centers, passes horizontal longitudinal shaft C, which is firmly secured in apertures cut in the frame A by means of nuts.

Located in grooves or mortises cut in the center of the peripheries or circumferences of the rollers B, are the metallic flanged rings or rims D, which are constructed in several parts and secured in position by means of screws which pass through apertures in the right-angular flanges of said rings, and enter the said rollers.

By so constructing and fastening the said rings, it will be remarked that they can be readily removed when useless or worn out, and others substituted in their place.

In order to facilitate the operation of performing the work to be done, instead of two rings, each of which is situated in the center of the rollers, I use others in connection therewith, by supplying the inner end of each of the rollers with a similar ring, but flanged on one side only, the object of which being to prevent their interfering with the rotation of the said ends of the rollers, and also providing the outer ends of said rollers with similar rings as the last-named, thus cutting or forming six furrows instead of two, as in the first case.

In cutting the furrow in sod ground, as is frequently required, especially in the "prairie country," I have found that a "tangent" tooth is best adapted for this purpose, which I attach, in any known way, to a ring of ordinary construction, supplied with apertures to receive screws for securing it in position on its roller, (see fig. 3.)

The said rings D may be of different sizes, to suit the furrow to the kind or size of seed to be planted.

F designates a metallic scraper, which is constructed in two parts, so as to prevent contact with the metallic brace in the center of frame A, and supplied with recesses to correspond with the shape of the edges of rings D, against which it is brought to bear.

The said scraper embraces at its upper end a horizontal shaft, $f$, running lengthwise of the frame A, or parallel with the sides or circumferences of the rollers B, and having its bearings in journal-boxes screwed to the lower side of frame A, and supplied with cranks $f'$.

To the upper or opposite ends of said cranks are attached the rear ends of the connecting-rods $f^2$, which are attached at their front ends to the lower ends of cranks $f^3$, secured to the projecting ends of the right-angular or longitudinal shaft $f^4$.

In order to keep this shaft in its proper position on frame A, I construct it with two shoulders, located thereon directly inside of the end pieces of the said frame.

$f^5$ designates a foot-lever, rigidly secured at its lower end to the center of the shaft $f^4$, and supplied at its upper end with the receptacle for the foot, to operate it. The object of this lever is to communicate motion to the scraper F, for operating the same, causing it to be brought in contact with or released from the said rollers B.

G is a transverse metallic strip or bar, extending across the space between the front and rear bars of frame A, to which it is secured by means of screws passing through apertures cut in right-angular strips or flanges secured at each end of said bar G. This bar is for the purpose of strengthening the frame A, and forms a support for the center of the shaft C.

The rollers B are held or kept a suitable distance apart by means of collars or shoulders secured or formed on the said shaft C.

H designates the drivers' seat, which is mounted upon the semicircular bars or strips of spring metal, with sufficient elasticity to form springs for the support of the seat, and secured at their ends to the front and rear pieces of frame A.

Having thus described my invention, I will indicate what I claim and desire to secure by Letters Patent in the following clause:

I claim—

The employment, in connection with a field-roller or rollers, of a ring or rings supplied with curvilinear teeth, arranged and operating as and for the purpose set forth.

In testimony that I claim the foregoing, I have hereunto set my hand and seal this 10th day of May, 1870.

ROBERT ANDERSON McCONAUGHY. [L. S.]

Witnesses:
F. F. SHAW,
JONATHAN KELLEY.